(12) United States Patent
Singh et al.

(10) Patent No.: US 7,672,238 B2
(45) Date of Patent: Mar. 2, 2010

(54) MAPPING OFF-NETWORK TRAFFIC TO AN ADMINISTERED NETWORK

(75) Inventors: Pradeep Singh, Arlington, VA (US);
Kent Hundley, Florence, KY (US);
David Manowitz, Washington, DC (US);
David James Boyd, Fulton, MD (US);
Nishant Gupta, Sammamish, WA (US);
Vinod Jeyachandran, Rockville, MD (US)

(73) Assignee: Opnet Technologies, Inc., Bethesda, MD (US)

( * ) Notice: Subject to any disclaimer, the term of this patent is extended or adjusted under 35 U.S.C. 154(b) by 210 days.

(21) Appl. No.: 11/835,130

(22) Filed: Aug. 7, 2007

(65) Prior Publication Data

US 2008/0037423 A1     Feb. 14, 2008

Related U.S. Application Data

(60) Provisional application No. 60/821,819, filed on Aug. 8, 2006.

(51) Int. Cl.
*H04L 15/00* (2006.01)

(52) U.S. Cl. .................. 370/231; 370/229; 370/235
(58) Field of Classification Search ................. 370/231, 370/229, 228
See application file for complete search history.

(56) References Cited

U.S. PATENT DOCUMENTS

| | | | | |
|---|---|---|---|---|
| 5,042,027 A * | 8/1991 | Takase et al. | ................ | 370/252 |
| 5,870,564 A * | 2/1999 | Jensen et al. | ................ | 709/241 |
| 5,996,021 A * | 11/1999 | Civanlar et al. | ............. | 709/238 |
| 6,137,782 A * | 10/2000 | Sharon et al. | ............... | 370/255 |
| 6,262,976 B1 * | 7/2001 | McNamara | ................. | 370/254 |
| 6,538,991 B1 * | 3/2003 | Kodialam et al. | ........... | 370/229 |
| 6,584,071 B1 * | 6/2003 | Kodialam et al. | ........... | 370/238 |
| 6,647,412 B1 * | 11/2003 | Strandberg et al. | .......... | 709/223 |
| 6,804,196 B1 * | 10/2004 | Kadengal | .................... | 370/230 |
| 6,873,600 B1 * | 3/2005 | Duffield et al. | ............. | 370/252 |
| 6,934,745 B2 * | 8/2005 | Krautkremer | ............... | 709/223 |
| 6,956,821 B2 * | 10/2005 | Szviatovszki et al. | ....... | 370/237 |
| 7,145,867 B2 * | 12/2006 | Aicklen et al. | .............. | 370/228 |
| 7,251,215 B1 * | 7/2007 | Turner et al. | ................. | 370/231 |
| 7,260,064 B2 * | 8/2007 | Basu et al. | ................... | 370/238 |
| 7,269,157 B2 * | 9/2007 | Klinker et al. | .............. | 370/351 |
| 7,468,975 B1 * | 12/2008 | Davis | ......................... | 370/389 |

(Continued)

OTHER PUBLICATIONS

Uhlig S. et al., "Tweak-it: BGP-Based Interdomain Traffic Engineering for Transit ASs"; Next Generation Internet Networks, 2005, pp. 75-82, XP010798809, ISBN: 978-0-7803-8900-7, Sections IV and V; Rome, Italy; Apr. 18-20, 2005, Piscataway, NJ, USA, IEEE, Apr. 18, 2005.

*Primary Examiner*—Chi H Pham
*Assistant Examiner*—Robert Lopata
(74) *Attorney, Agent, or Firm*—Coats & Bennett

(57) ABSTRACT

Traffic flows through an administered network from an off-network source and/or to an off-network destination are simulated and analyzed by selecting an ingress and/or egress node within the administered network, the ingress node capable of collecting traffic from an off-network source, and the egress node capable of routing traffic to an off-network destination. Traffic flow is mapped from the source or ingress node through the administered network to the egress node. The traffic flow may be simulated and analyzed. The ingress and/or egress nodes may be selected in a variety of ways.

26 Claims, 4 Drawing Sheets

U.S. PATENT DOCUMENTS

| | | |
|---|---|---|
| 2002/0051449 A1 | 5/2002 | Iwata |
| 2002/0083174 A1* | 6/2002 | Hayashi et al. ............. 709/225 |
| 2002/0141345 A1* | 10/2002 | Szviatovszki et al. ....... 370/238 |
| 2003/0081608 A1* | 5/2003 | Barri et al. ................. 370/392 |
| 2003/0118036 A1 | 6/2003 | Gibson et al. |
| 2003/0193949 A1* | 10/2003 | Kojima et al. ............... 370/392 |
| 2004/0064537 A1* | 4/2004 | Anderson et al. ........... 709/223 |
| 2004/0071082 A1* | 4/2004 | Basu et al. ................. 370/229 |
| 2004/0156313 A1* | 8/2004 | Hofmeister et al. ......... 370/229 |
| 2005/0018608 A1* | 1/2005 | Wetherall et al. ........... 370/235 |
| 2005/0254490 A1* | 11/2005 | Gallatin et al. .............. 370/389 |
| 2005/0265248 A1* | 12/2005 | Gallatin et al. .............. 370/250 |
| 2005/0265364 A1* | 12/2005 | Gallatin et al. .............. 370/401 |
| 2005/0271065 A1* | 12/2005 | Gallatin et al. .............. 370/401 |
| 2006/0221974 A1* | 10/2006 | Hilla et al. .................. 370/394 |
| 2007/0192863 A1* | 8/2007 | Kapoor et al. ................ 726/23 |
| 2008/0002588 A1* | 1/2008 | McCaughan et al. ........ 370/238 |
| 2008/0002707 A1* | 1/2008 | Davis ......................... 370/392 |
| 2008/0084890 A1* | 4/2008 | Kompella ................... 370/400 |
| 2008/0259793 A1* | 10/2008 | Bauer et al. ............... 370/230.1 |
| 2009/0059793 A1* | 3/2009 | Greenberg ................. 370/235 |

* cited by examiner

MAPPING OFF-NETWORK TRAFFIC TO AN ADMINISTERED NETWORK

This application claims priority to U.S. Provisional Application Ser. No. 60/821,819, filed Aug. 8, 2006, and incorporated herein by reference in its entirety.

BACKGROUND

Many businesses maintain networks that are connected to much wider networks, of which they have limited knowledge. As one representative example, many service providers utilize telecommunication, computer, or other networks in delivering services to customers. The ability to abstract the network into a database, simulate traffic flows through the network, and analyze many aspects of the network's operation, allows service providers to optimize existing networks, plan for future growth, and increase reliability by simulating network failures. The ability to accurately simulate traffic and analyze a network is limited by the information available about actual network facilities (e.g., nodes such as routers and switches, and links such as telecommunication channels). In particular, modeling data flows from a source or to a destination that is not within the service provider's administered network is difficult, since traditional point-to-point (i.e., source-to-destination) analysis is impossible due to the inability to know what off-network facilities the traffic flow is routed through, much less the characteristics and capacities of the off-network facilities.

However, the need remains for service providers and other network administrators to be able to perform high fidelity simulations of real-world traffic, to accurately plan and provision the facilities within their administered network.

SUMMARY

According to one or more embodiments disclosed and claimed herein, off-network traffic flows through an administered network are simulated and analyzed by selecting an ingress and/or egress node within the administered network, the ingress node capable of collecting traffic from an off-network source, and the egress node capable of routing traffic to an off-network destination. Traffic flow through the administered network from the ingress to the egress node is simulated and analyzed. Several approaches to selecting the ingress and/or egress nodes are presented.

One embodiment relates to a method of mapping network traffic flow in an administered network from a source to a destination, where at least the destination of the traffic is not within the administered network. Routing information at edge devices of the administered network is inspected. One or more candidate egress nodes within the administered network that are capable of routing traffic to the destination address are determined, based on the routing information. An egress node is selected from among the candidate egress nodes. The traffic flow is mapped from the source or an ingress node, through the administered network, to the selected egress node.

Another embodiment relates to a computer readable medium including one or more computer programs operative to cause a computer to analyze traffic flow in an administered network from a source to a destination, where at least the destination of the traffic is not within the administered network. The computer programs are operative to cause the computer to perform the steps of inspecting routing information at edge devices of the administered network; determining one or more candidate egress nodes within the administered network that are capable of routing traffic to the destination address, based on the routing information; selecting an egress node from among the candidate egress nodes; and mapping the traffic flow from the source or an ingress node, through the administered network, to the selected egress node.

DETAILED DESCRIPTION

Figure 1:
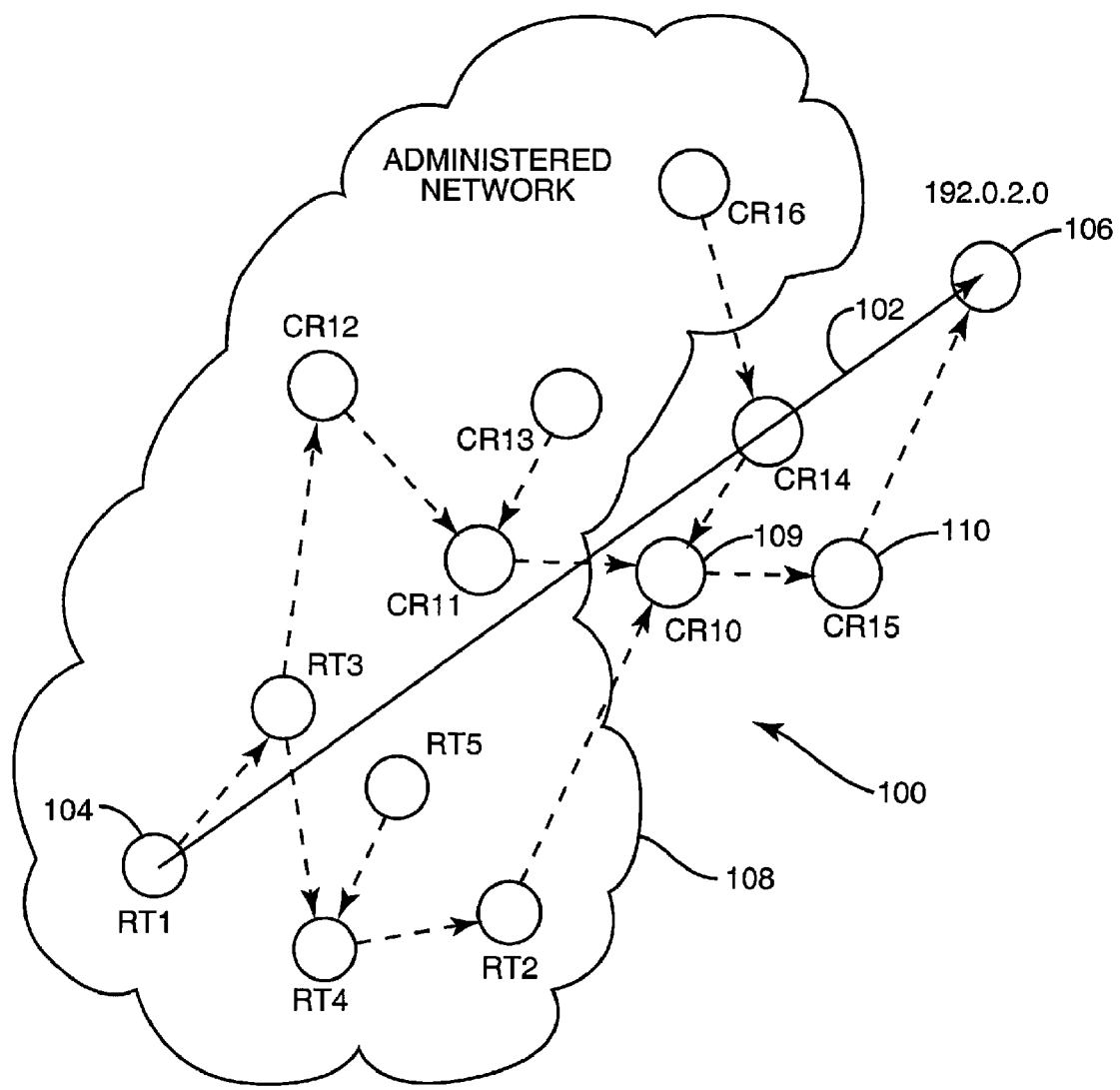
FIG. 1 is a network diagram depicting a traffic flow from a source to a destination node through and administered network and other network facilities.

FIG. 1 depicts a representative network 100 carrying a traffic flow 102, depicted as a solid line, from a source node 104 (RT1) to a destination node 106 (192.0.2.0). The traffic flow 102 is routed between nodes in an administered network 108, and one or more off-network nodes such as nodes 109 (CR10) and 110 (CR15). Actual point-to-point route segments, or hops, are depicted as directed, dashed lines between network nodes. Although node 104 (RT1) is depicted as a source node, in one embodiment the node 104 (RT1) is a node within the administered network 108 that collects traffic from an off-network source node (not shown).

Figure 2:
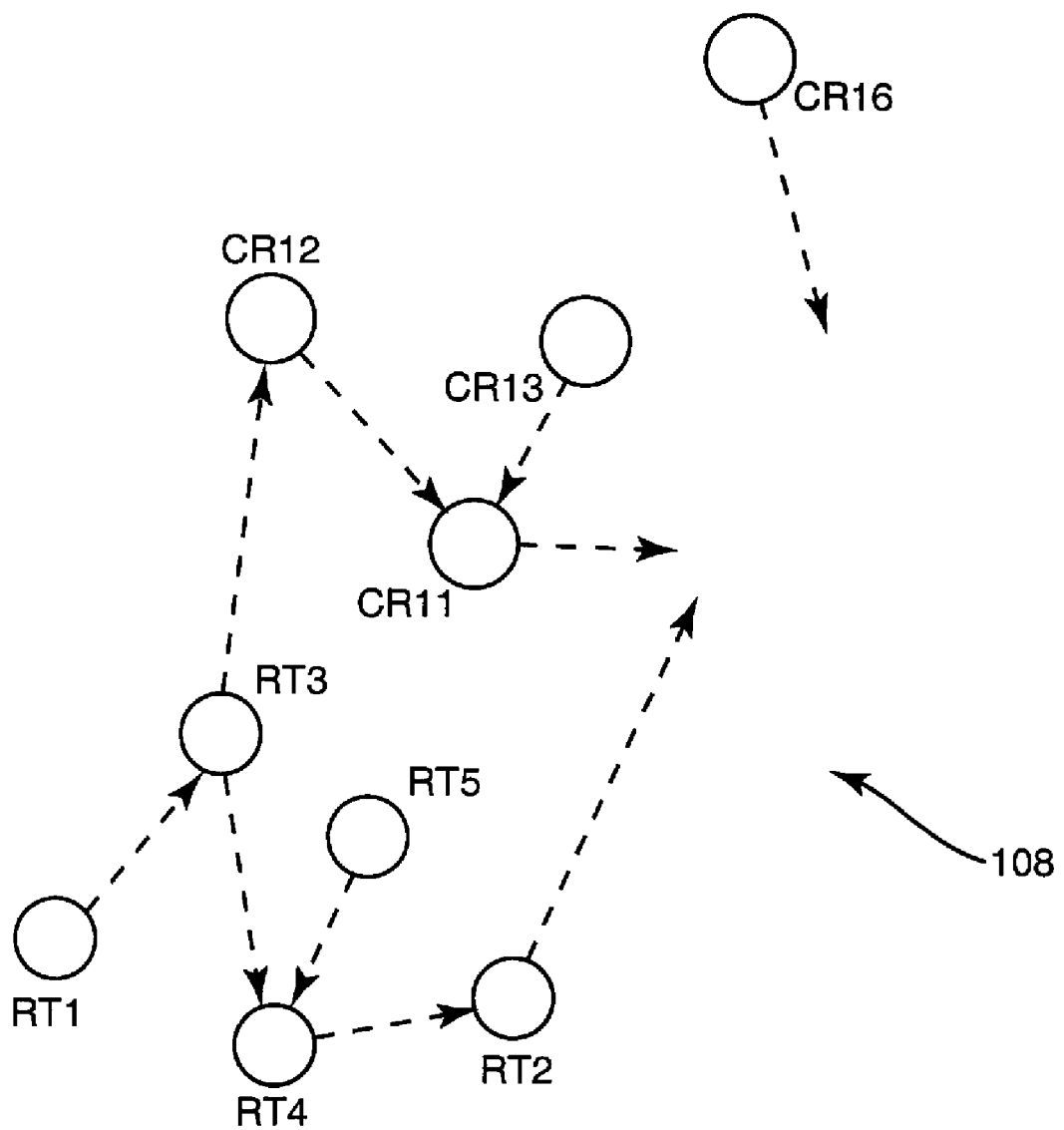
FIG. 2 is a network diagram of the administered network of FIG. 1.

In general, when simulating and analyzing the administered network 108, neither the off-network topology nor any details of off-network facilities are known. FIG. 2 depicts the administered network 108 alone. These are the only facilities about which detailed information is available for traffic flow simulation and network analysis. To accurately simulate and analyze traffic flows through the administered network 108, off-network source and/or destination nodes are mapped to edge nodes of the administered network 108. As used herein, an edge node is a node with one or more unconnected interfaces (when the administered network 108 is considered in isolation, as depicted in FIG. 2). An off-network source node is mapped to an ingress node of the administered network 108, and an off-network destination node is mapped to an egress node. Traffic flows between the ingress node and the egress node may then be simulated, using the available, detailed information about the administered network 108 facilities.

An off-network destination node may be mapped to an egress node in a variety of ways, by consulting edge device routing tables. As well known in the art, a routing table is a file or database structure maintained at a router or other network node that stores routes (i.e., network paths), and optionally metrics associated with the routes, to network destinations. In modern networks utilizing structured network addresses, similar addresses imply proximity within the network. When addresses are structured (such as IP addresses), a partial address, such as a prefix, may be sufficient to route traffic towards a destination node. If the routing table at an edge node does not contain any portion of a destination address, the edge node cannot be an egress node for simulating traffic flows to that destination. Conversely, every edge node with a routing table entry matching some or all of the destination address is a candidate egress node for simulating traffic flows to that destination. A set of candidate egress nodes may thus be determined by inspecting routing tables at all edge nodes. If the routing tables are not available for some or all edge nodes, the tables may be built by a flow analysis run in a network simulator. An egress node may be selected from among the set of candidate egress nodes in a variety of ways.

In one embodiment, an egress node is selected from among the set of candidate egress nodes prior to performing any simulation of traffic through the administered network 108 to the off-network destination 106. In one embodiment, prefix graphs are used to formulate a directed topological graph through the administered network of all paths from the source (or ingress) node 104 to all candidate egress nodes, based on the routing tables. The egress node may then be selected by applying known network constraints to the paths. The constraints may, for example, include least cost, fewest hops, greatest bandwidth, or the like. Alternatively, an egress node may be selected from the candidate set manually, randomly, or by other criteria.

For example, by inspection of FIG. 1, we see that the candidate egress nodes for a traffic flow to off-network destination node 106 comprise CR11 and RT2, both of which include off-network node 109 (CR10) in their routing tables. One of these nodes may be selected at random, such as RT2, yielding the intra-network traffic flow 112 depicted in FIG. 3, comprising nodes RT1-RT3-RT4-RT2. This graphic display of a point-to-point flow is one means of depicting the mapping of off-network traffic flows through the administered network.

Having a known route through the administered network 108 for the traffic flow to the off-network destination 106 is useful for transit network planning—that is, planning the capacity of the transit network. However, the source/ingress-to-egress simulations do not illuminate the network capacity requirements in the case of failures. For example, if node RT4 failed, traffic to the off-network destination 106 would likely be routed along the path RT1-RT3-CR12-CR11, making node CR11 the egress node for traffic flow to the off-network destination 106. In order to capture all such cases, exit point analysis must be performed to discover all valid egress nodes. Exit point analysis is performed with a single-point flow 114, as depicted graphically in FIG. 3.

In one embodiment, only the source (or ingress) node 104, e.g., RT1, is specified, and an egress node is selected from among the set of candidate egress nodes by simulating traffic flow through the administered network 108 to the off-network destination 106. As mentioned above, node 104 (RT1) may be the source of traffic flow to the off-network destination 106. Alternatively, the source node may reside outside of the administered network 108, with the traffic entering the network 108 at the ingress node 104. For the purpose of exit point analysis, the distinction is irrelevant; the node RT1 may be a source of the traffic flow, or it may be the ingress node in the administered network 108 for an off-network source.

In the latter case, traffic analysis (of actual traffic or simulations) discovers the edge nodes that are collection points for traffic routed to the off-network destination 106. If a collection point is an edge device of the administered network 108, it is treated as an ingress node. If the collection point is not an edge device, an ingress node may be determined by treating the collection point as a source and mapping to the off-net source in a manner similar to the search for egress candidates, i.e., by creating a prefix graph and looking for edge devices with routing table destinations to the off-net source. Each ingress node may then be specified in a separate simulation to perform exit point analysis to discover egress node(s).

Figure 3:
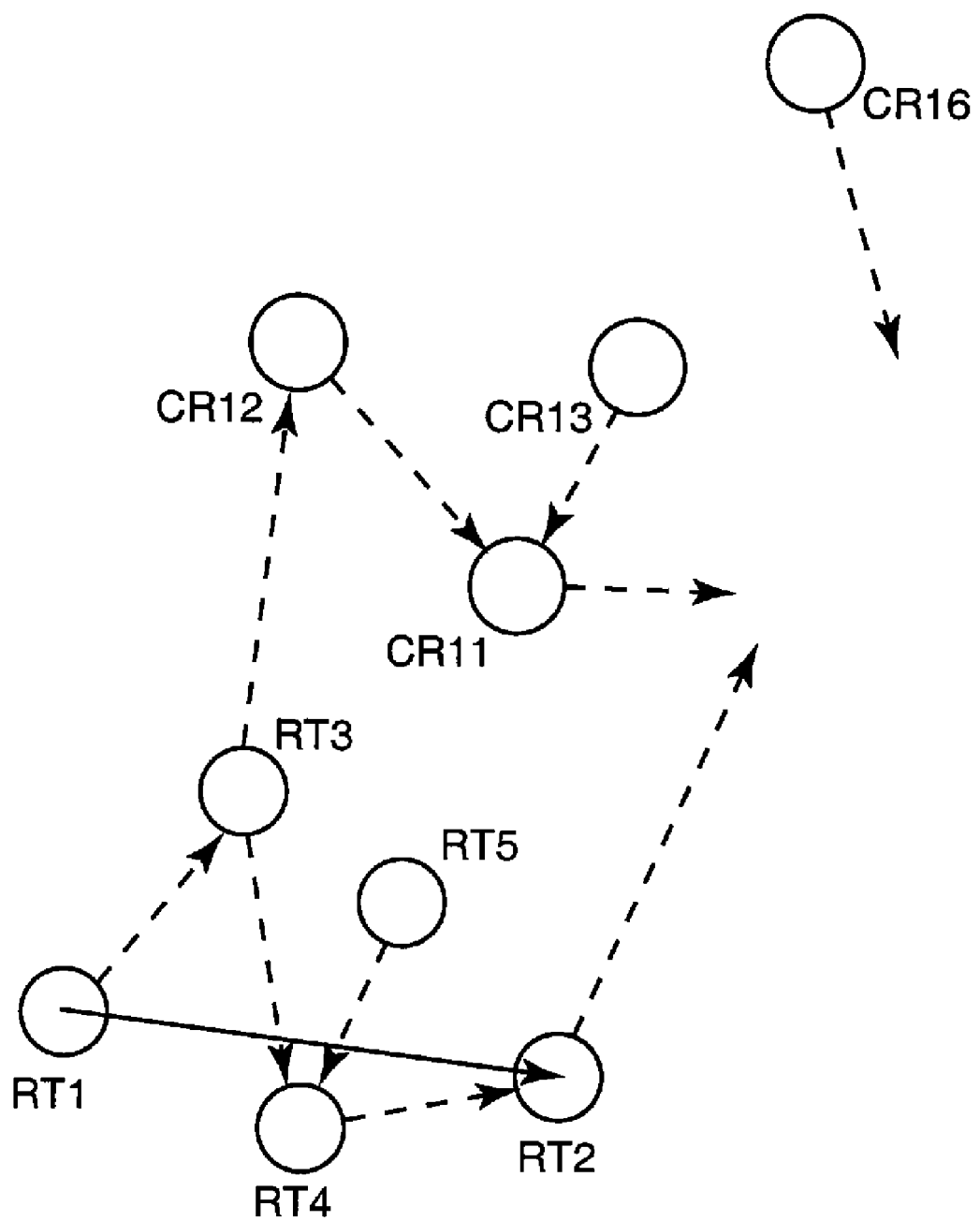
FIG. 3 is a network diagram of the administered network of FIG. 1 depicting one intra-administered network traffic flow.

When specifying only a source/ingress node 104, a simulation of traffic flow through the administered network 108 to the off-network destination 106 will yield all egress nodes. However, since the destination 106 is not within the administered network 108, a metric to evaluate the success or failure of the end point analysis is necessary. In one embodiment, a traffic flow from a source/ingress node 104 to an egress node is defined as successful if it can be routed through the administered network 108 until it reaches a node where the next hop for the destination points to an unconnected interface. However, if a lookup in the routing table for this destination fails on any of the nodes along the way, the flow is defined as failed. For example, the traffic flow 112 depicted in FIG. 3 is considered successful since the next hop from RT2 towards the destination 106 is to an unconnected interface. However, if both RT4 and CR12 failed, the lookup on RT3 would fail to find a node to which to forward the traffic, and the flow would be defined as failed.

Figure 4:
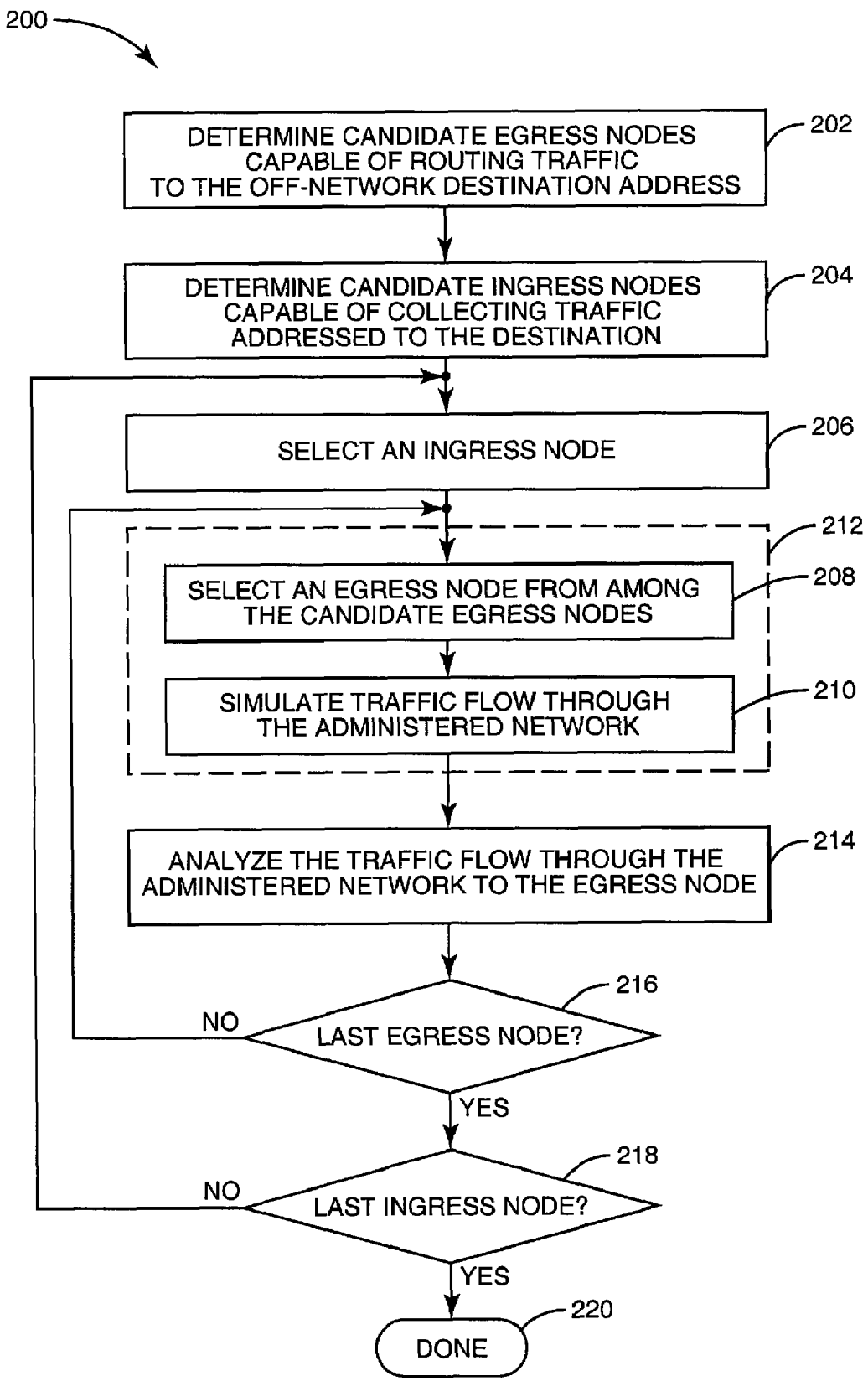
FIG. 4 is a flow diagram of an iterative method of analyzing off-network traffic flow through an administered network.

FIG. 4 depicts an iterative method for traffic flow analysis through an administered network, where the source and destination addresses of the traffic flow reside outside the administered network. The method begins by inspecting the routing tables of edge nodes in the administered network to determine a set of candidate egress nodes capable of routing traffic to the off-network destination address (block 202). A set of candidate ingress nodes capable of collecting traffic addressed to the destination into the administered network are determined by traffic analysis (block 204). This comprises taking the collection point as an ingress node if it is an edge device, and otherwise, mapping to the off-net source from the collection point to discover one or more ingress nodes. If two or more candidate ingress nodes are found, one is selected (block 206). An egress node is selected from among the candidate egress nodes (block 208). In one embodiment, the egress node is selected prior to simulating traffic flow through the administered network (block 210), such as by applying network constraints to the paths from the selected ingress node to all candidate egress nodes. In another embodiment, only the ingress node is specified, and the egress node is selected during the simulation (depicted by block 212, merging the functions of blocks 208, 210). The simulated traffic flow through the administered network to the egress node is analyzed for, e.g., capacity, efficiency, resiliency, and the like. The method may be repeated for each egress node in the candidate set of egress nodes (block 216).

If the traffic flow source is off-network and more than one ingress node is detected, the method may be repeated for each ingress node (block 218). In the case that the source of traffic flow resides within the administered network, blocks 206 and 218 are omitted, and the source node is treated as the ingress node in the above discussion. When all paths through the administered network have been analyzed, the method terminates (block 220).

The network addresses (e.g., IP addresses) of devices behind a router or firewall are not always fixed. That is, the routing device may dynamically assign the address according to the Dynamic Host Configuration Protocol (DHCP). Network Address Translation (NAT)—the re-writing of source and/or destination addresses of IP packets as they pass through a router or firewall—may be implemented to insure that any transmissions originating from devices behind a router or firewall appear to the outside network as originating from the router or firewall instead of the devices themselves. NAT also enables any return transmissions to be routed back to the correct device.

If a source device is in the administered network 108 but behind a router or firewall, there are three approaches to representing the source. In one embodiment, the flow is simply terminated at the routing device. In another embodiment, a visual indicator is attached to a graphic representation of the routing device in a display or graph, indicating that the true source is unknown. In yet another embodiment, the configuration information of the routing device is captured to determine the true source, and the flow is terminated at that device.

The off-network traffic flow mapping to an administered network as disclosed and claimed herein may be implemented by discrete calculations, by specialized software executing on a general-purpose computer or dedicated network monitoring/optimization workstation, or by any combination of software, dedicated hardware, firmware, or the like, as known in the computing arts. In one exemplary embodiment, off-network traffic flow analyses are implemented as part of a network analysis and optimization software program, such as the OPNET SP Guru Release 12.0, available from OPNET Technologies, Inc. In one embodiment, a computer implementation of the off-network traffic flow mapping to an administered network generates a graphic output of the administered network 108, with the traffic flow mapping depicted, such as shown in FIG. 3. The graphic output may be to a screen, a printed or plotted graphic, or the like, as well known in the computing arts.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of mapping network traffic flow through a model of an administered network, where at least a destination of the network traffic flow, the destination having a network address, is not within the administered network, comprising:
    inspecting routing information at edge devices of the administered network;
    determining one or more candidate egress nodes within the administered network that are capable of routing traffic to the destination address, based on the routing information;
    selecting one or more egress nodes from among the candidate egress nodes; and
    determining a path of the network traffic flow within the model of the administered network from a source of the network traffic flow, the source having a network address, or an ingress node of the administered network, to one or more of the selected egress nodes.

2. The method of claim 1 further comprising simulating the determined paths within the model of the administered network.

3. The method of claim 1 wherein selecting an egress node from among the candidate egress nodes comprises selecting the egress node prior to performing the simulation.

4. The method of claim 3 further comprising:
    if the traffic source is not in the administered network, selecting an ingress node within the administered network capable of collecting traffic from the source address; and
    wherein selecting an egress node from among the candidate egress nodes prior to performing the simulation comprises applying network constraints to routes from the source or ingress node to each candidate egress node, and selecting the egress node for which a corresponding route best satisfies the applied constraints.

5. The method of claim 4 wherein a network constraint comprises least cost.

6. The method of claim 4 wherein a network constraint comprises fewest hops.

7. The method of claim 4 wherein analyzing the traffic flow through the administered network to the egress node comprises performing transit network planning.

8. The method of claim 4 further comprising outputting a graphic representation of at least part of the administered network, with the mapped traffic flow depicted as a directed graph from the source or ingress node to the egress node.

9. The method of claim 2 wherein selecting an egress node from among the candidate egress nodes comprises selecting the egress node during the simulation.

10. The method of claim 9 further comprising:
    if the traffic source is not in the administered network, selecting an ingress node within the administered network capable of collecting traffic from the source address; and
    wherein selecting an egress node from among the candidate egress nodes comprises simulating traffic flow from the source or ingress node through the administered network and selecting the egress node based on the simulated traffic flow.

11. The method of claim 10 wherein selecting an ingress node comprises:
    selecting a first ingress node capable of collecting traffic from the source address;
    routing the traffic to an egress node; and
    treating the egress node as a source, and routing the traffic back toward the first ingress node to discover a second ingress node.

12. The method of claim 9 wherein a route from the source or ingress node through the administered network to a selected egress node is deemed successful if it can be routed through the administered network until it reaches a node where the next hop for the destination points to an unconnected interface.

13. The method of claim 9 wherein a route from the source or ingress node through the administered network to a selected egress node is deemed a failure if a lookup in the routing table for the destination fails on any intermediate node in the administered network.

14. The method of claim 9 further comprising outputting a graphic representation of at least part of the administered network, with the mapped traffic flow depicted as an open-ended graph from the source or ingress node.

15. A non-transitory computer readable medium including one or more computer programs operative to cause a computer to map network traffic flow through a model of an administered network where at least a destination of the network traffic flow, the destination having a network address, is not within the administered network, the computer programs operative to cause the computer to perform the steps of:
    inspecting routing information at edge devices of the administered network;
    determining one or more candidate egress nodes within the administered network that are capable of routing traffic to the destination address, based on the routing information;
    selecting one or more egress nodes from among the candidate egress nodes; and
    determining the path of the network traffic flow within the model of the administered network from a source of the network traffic flow, the source having a network address, or an ingress node, of the administered network, to one or more of the selected egress nodes.

16. The computer readable medium of claim 15 wherein the computer programs are further operative to cause the computer to perform the step of simulating the determined paths within the model of the administered network.

17. The computer readable medium of claim 16 wherein selecting an egress node from among the candidate egress nodes comprises selecting the egress node prior to performing the simulation.

18. The computer readable medium of claim 17 wherein the computer programs are further operative to cause the computer to perform the step of:
- if the traffic source is not in the administered network, selecting an ingress node within the administered network capable of collecting traffic from the source address; and
- wherein selecting an egress node from among the candidate egress nodes prior to performing the simulation comprises applying network constraints to routes from the source or ingress node to each candidate egress node, and selecting the egress node for which a corresponding route best satisfies the applied constraints.

19. The computer readable medium of claim 18 wherein a network constraint comprises least cost.

20. The computer readable medium of claim 18 wherein a network constraint comprises fewest hops.

21. The computer readable medium of claim 18 wherein analyzing the traffic flow through the administered network to the egress node comprises performing transit network planning.

22. The computer readable medium of claim 16 wherein selecting an egress node from among the candidate egress nodes comprises selecting the egress node during the simulation.

23. The computer readable medium of claim 22 wherein the computer programs are further operative to cause the computer to perform the step of:
- if the traffic source is not in the administered network, selecting an ingress node within the administered network capable of collecting traffic from the source address; and
- wherein selecting an egress node from among the candidate egress nodes comprises simulating traffic flow from the source or ingress node through the administered network and selecting the egress node based on the simulated traffic flow.

24. The computer readable medium of claim 23 wherein selecting an ingress node comprises:
- selecting a first ingress node capable of collecting traffic from the source address;
- routing the traffic to an egress node; and
- treating the egress node as a source, and routing the traffic back toward the first ingress node to discover a second ingress node.

25. The computer readable medium of claim 22 wherein a route from the source or ingress node through the administered network to a selected egress node is deemed successful if it can be routed through the administered network until it reaches a node where the next hop for the destination points to an unconnected interface.

26. The computer readable medium of claim 22 wherein a route from the source or ingress node through the administered network to a selected egress node is deemed a failure if a lookup in the routing table for the destination fails on any intermediate node in the administered network.

* * * * *